United States Patent [19]
Kawasaki et al.

[11] Patent Number: 5,574,646
[45] Date of Patent: Nov. 12, 1996

[54] GEAR NOISE EVALUTATION SYSTEM

[75] Inventors: Yoshiki Kawasaki; Masahiko Karube; Tatsuhiko Nishioka, all of Fujisawa, Japan

[73] Assignee: Isuzu Motors Limited, Tokyo, Japan

[21] Appl. No.: 609,944

[22] Filed: Feb. 29, 1996

[51] Int. Cl.$^6$ .................................................. G06F 15/18
[52] U.S. Cl. .................... 364/431.08; 364/157; 364/508; 73/660
[58] Field of Search .......................... 73/660; 364/431.01, 364/431.03, 431.04, 431.07, 431.08, 511, 551.01, 274.9, 276.6, 156, 157, 972.4, 424.03, 424.04, 507, 508

[56] References Cited

U.S. PATENT DOCUMENTS

| | | | |
|---|---|---|---|
| 3,758,758 | 9/1973 | Games et al. | 73/67.2 |
| 4,872,337 | 10/1989 | Watts et al. | 364/424.1 |
| 4,965,513 | 10/1990 | Haynes et al. | 73/659 |
| 5,307,676 | 5/1994 | Gutman | 73/162 |
| 5,445,027 | 8/1995 | Zörner | 73/660 |

*Primary Examiner*—Emanuel T. Voeltz
*Assistant Examiner*—Craig Steven Miller
*Attorney, Agent, or Firm*—Stass & Halsey

[57] ABSTRACT

A gear noise evaluation system having a neuro-computer which is provided with sound pressure values from an FFT analyzer. At this time, an evaluator simultaneously presets an absolutely sensual evaluating value as a teacher signal from a control bench. The neuro-computer repeatedly performs a learning so that the pressure values may become the absolutely sensual evaluating value until the difference between the sound pressure value and the sensual evaluating value lies in a permissive error range thereby determining a function value.

5 Claims, 8 Drawing Sheets

PRIOR ART

FIG. 8

GEAR NOISE EVALUATION SYSTEM

BACKGROUND OF THE INVENTION

1. Field of the Invention

This invention relates to a gear noise evaluation system, and in particular to a system for absolutely evaluating gear noises generated from a transmission in a car.

2. The Prior Art

Gear noises of a transmission have been so far evaluated sensually by those who have undergone an advanced training. One example of such a sensual or sensory evaluation is indicated in the following Table 1.

TABLE 1

EXAMPLE OF SENSUAL GEAR NOISE EVALUATION

| POINT | | CONTENTS |
|---|---|---|
| 10 | EXCELLENT | NOT NOTICEABLE EVEN BY TRAINED EVALUATORS |
| 9 | VERY GOOD | NOTICABLE ONLY BY TRAINED EVALUATORS |
| 8 | GOOD | NOTICABLE ONLY BY CRITICAL CUSTOMERS |
| 7 | SATISFACTORY | NOTICABLE BY ALL CUSTOMERS |
| 6 | AGREEABLE | RATED DUSTURBING BY SOME CUSTOMERS |
| 5 | MEDIOCRE | RATED DISTURBING BY ALL CUSTOMERS |
| | | ↑ IN ABOVE, SHIPMENT IS ALLOWABLE. |
| 4 | POOR | RATED AS FAILURE BY ALL CUSTOMERS |
| 3 | VERY POOR | COMPLAINED AS BAD FAILURE BY ALL CUSTOMERS |
| 2 | BAD | LIMITED OPERATION |
| 1 | VERY BAD | NON OPERATION |

Taking examples in Table 1, such gear noises as even a highly trained inspector can not hear are evaluated as Point 10, and such gear noises as all customers recognize as noises or disturbing sounds are evaluated as Point 5. For a transmission generating the gear noises evaluated as Point 5 or above, for example, the shipment thereof is allowable.

It is to be noted that such a sensual evaluation by a highly trained inspector can be realized for each gear position (stage).

On the other hand, such gear noises as all customers feel noisy are evaluated as Point 4, and such gear noises as generated when the gear fails to operate at all are evaluated as Point 1.

Different from a humanly sensual evaluation as indicated above, there has been also adopted a relative evaluation system using an instrument such as an FFT (Fast Fourier Transform) analyzer i.e. Frequency Analyzer.

Figure 7:
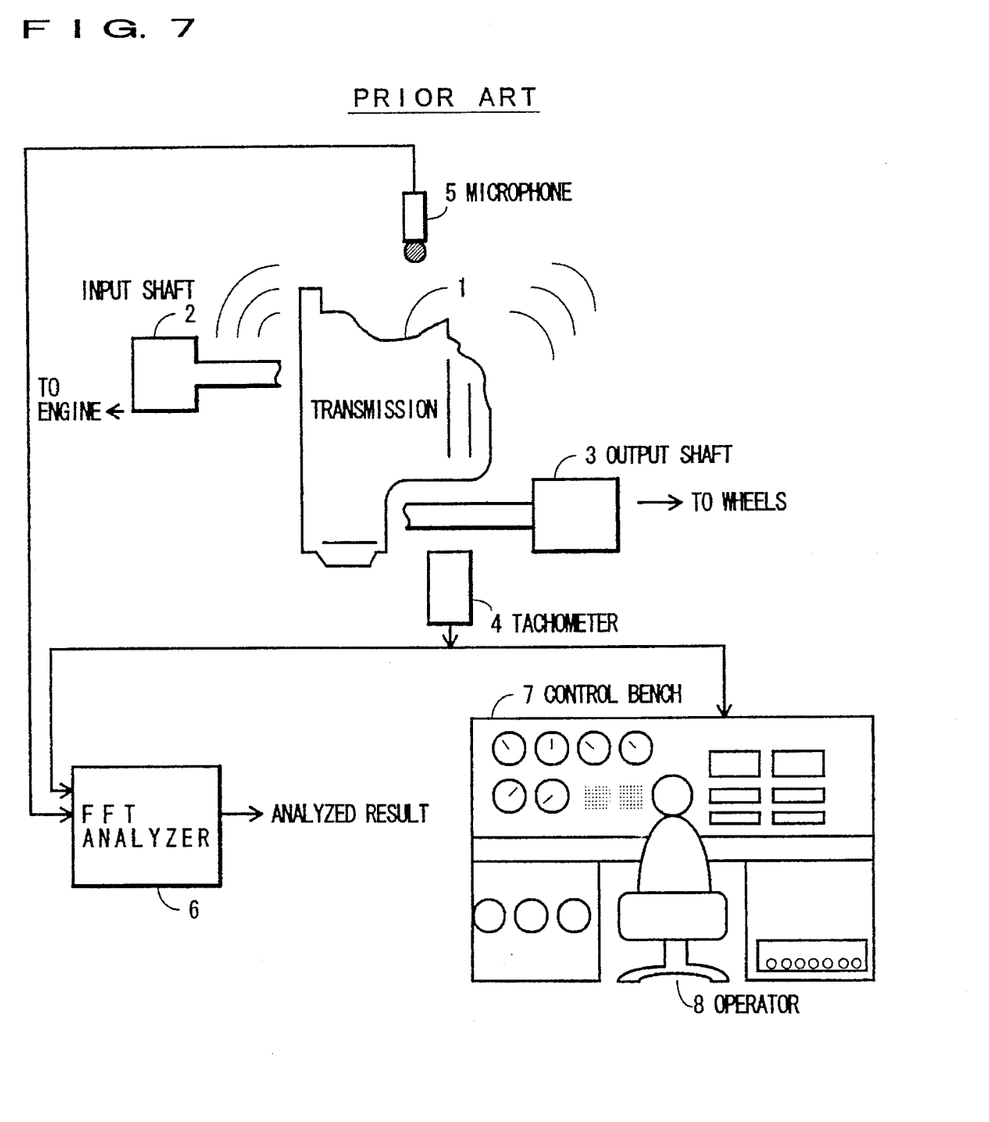
FIG. 7 is a diagram showing the prior art gear noise evaluation system.

FIG. 7 shows a prior art gear noise evaluation system using such an instrument. A transmission 1 is connected to an input shaft 2 and an output shaft 3. The input shaft 2 is connected to an engine (not shown) and the output shaft 3 is connected to wheels (not shown) of a car.

A rotative speed sensor, rotational frequency sensor, or tachometer (hereinafter referred to as tachometer) 4 is provided so as to detect the rotative speed (rpm) of the output shaft 3 or the input shaft 2, and a microphone 5 is provided so as to detect the gear noise of the transmission 1.

Figure 8:
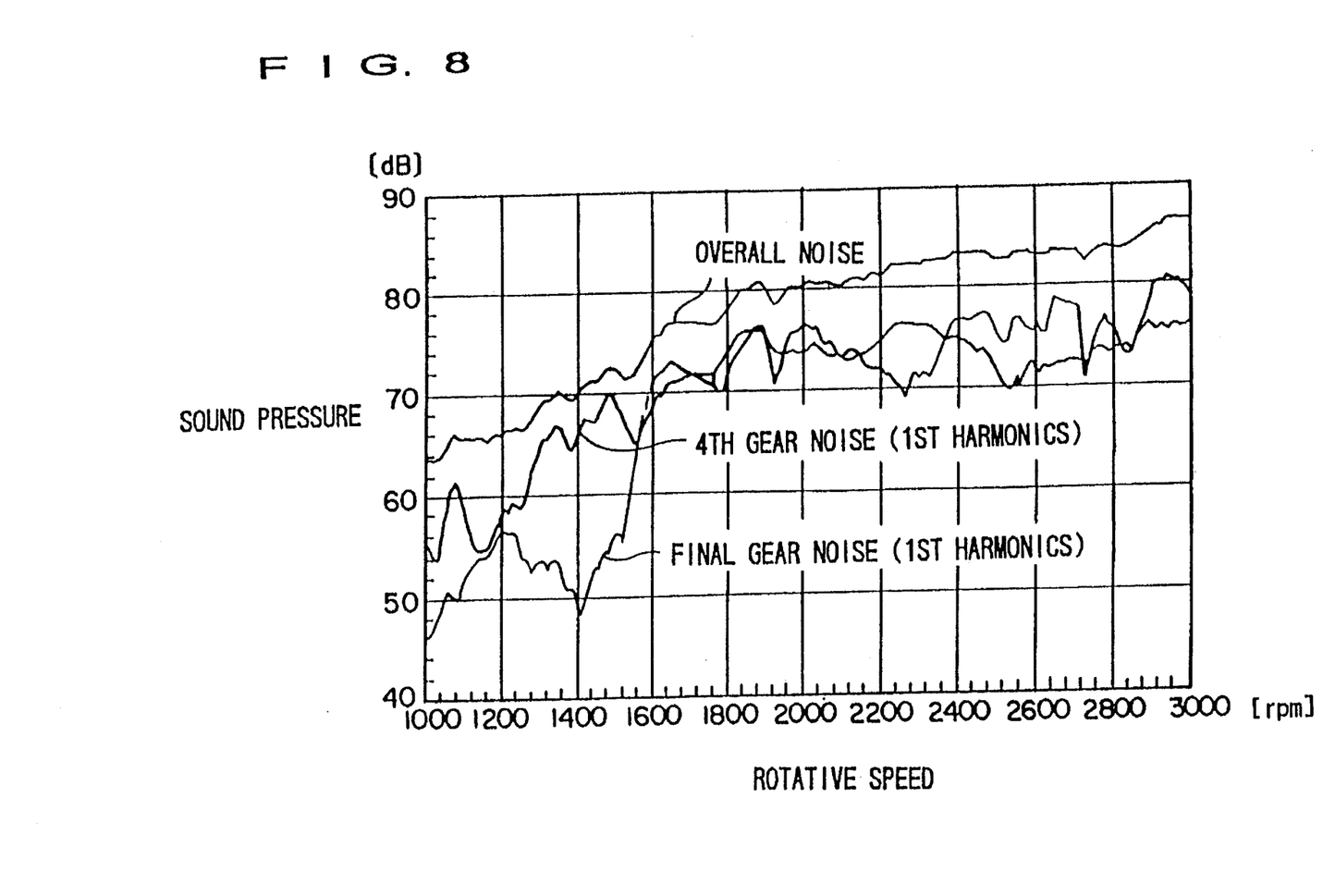
FIG. 8 is a graph illustrating RPM tracking analysis data with respect to rotative speeds (frequencies) for each gear position obtained from the FFT analyzer used in the present invention as well as the prior art.

The output signals of the tachometer 4 and the microphone 5 are received by the FFT analyzer 6 having a display screen displaying sound pressures of a gear noise at each gear position and of an overall noise with respect to rotative speeds, as shown in FIG. 8. It is to be noted that this display screen shows a characteristic of sound pressures with respect to rotative speeds at the primary engagement frequency.

The output signal of the tachometer 4 is also supplied to a control bench 7 so that an operator 8 sitting in front of the control bench 7 may monitor the rotative speed of the output shaft 3.

Namely, it is not neccesary that the operator 8 is the sensual evaluator who performs such an evaluation as indicated in Table 1. While watching the rotative speed of the output shaft 3 indicated by the output signal of the tachometer 4 through a correspoding instrument equipped in the control bench 7, the operator 8 goes on increasing the rotative speed by e.g. 100 rpm, as shown in FIG. 8. Every time the rotative speed is manually increased, the rotative speed detected by the tachometer 4 and the gear noise taken from the microphone 5 are received as an input by the FFT analyzer 6.

From these input signals, the FFT analyzer 6 displays a frequency analysis of a gear noise (sound pressure) every engagement order as the rotative speed increases, as shown in FIG. 8.

Then, the operator 8 judges from the frequency analysis that the gear noise is large when the difference in sound pressure between the overall noise and the other gear noises is small or what the present gear noise is like depending on the waveform pattern.

It is therefore disadvantageous that the above sensual evaluation by an evaluator provides individually different results and the instrumental evaluation shown in FIG. 7 can not provide a quantatively accurate judgement.

Also, no correlation can be substantiated between such an evaluation in a laboratory as shown in FIG. 7 and corresponding noise measurements actually done in a car. Namely, the latter case has many kinds of noise mingled into a microphone and largely damages the correlation with the former case because it is quite different in conditions and environments, resulting in being impractical.

SUMMARY OF THE INVENTION

It is accordingly an object of the present invention to provide a gear noise evaluation system wherein a sensual evaluation coincides with an instrumental evaluation.

As described above, an expert's sensual evaluation and an instrumental evaluation are often different in contents per se from each other. This is caused by the fact that the FFT analyzer can only make an analysis between frequency and sound pressure among the three elements of sound and so can not evaluate "tone" which is another sound element.

In view of the tone deemed as ocurring due to the combination of spectral intensities and attenuated spectral values of a sound having various frequency components, the inventors of the present invention has taken note of a computerized sensual evaluation which can automatically evaluate the combination and the attenuation of frequency components by means of a neuro-computer (neural network).

Namely, a neuro-computer can automatically modify parameters (weighting coefficients) used therein so that an output signal with respect to an input signal may accord with a teacher signal to be referenced.

Accordingly, a gear noise evaluation system according to the present invention comprises; a tachometer for detecting a rotative speed of a shaft on which a gear is mounted; a microphone for detecting a noise from the gear; an FFT analyzer which repeatedly receives as an input the rotative speed from the tachometer and the noise from the microphone and provides as an output a sound pressure value with respect to the rotative speed for a predetermined gear position; a control bench where the rotative speed of the shaft is indicated and changed by an evaluator presetting an absolutely sensual evaluating value as a teacher signal with respect to the rotative speed of the shaft; and, a neuro-computer which receives as an input the sound pressure value from the FFT analyzer, learns to attain the absolutely sensual evaluating value, stops learning when the difference between the sound pressure value and the absolutely sensual evaluating value from the control bench lies in a permissive error range thereby determining a function value.

In the present invention, the FFT analyzer, like the prior art, receives many times as an input from the tachometer a rotative speed of a shaft on which a gear is mounted as well as a gear noise from the microphone, and provides as an output a sound pressure value (see FIG. 8) with respect to the rotative speed for a predetermined gear position.

Meanwhile, when the evaluator changes the rotative speed of the shaft from the control bench where the evaluator simultaneously presets an absolutely sensual evaluating value as a teacher signal (reference signal) for respective rotative speeds.

The sound pressure values from the FFT analyzer are received as inputs by the neuro-computer in which the learning for a function value (parameter) of the neural network is performed by a predetermined number of absolutely sensual evaluating values so that the input may become such an absolutely sensual evaluating value as a teacher signal and is stopped when the difference between the sound pressure value and the sensual evaluating value lies in a permissive error range. At this time, the function value is settled.

In the case that the gear noise evaluation system combined with the neuro-computer having the function value thus determined is used for an actual gear noise evaluation, the output signals from the microphone and the tachometer are supplied as sound pressure values for respective rotative speeds obtained through the FFT analyzer to the neuro-computer which will provide as an output a sensual evaluation value according to the function value as already set.

[2] Also, the gear noise evaluation system according to the present invention, for the purpose of evaluating gear noises without using such a neuro-computer as described above, comprises; a tachometer for detecting a rotative speed of a shaft on which a gear is mounted; a microphone for detecting a noise from the gear; a converter for converting the frequency of the rotative speed from the tachometer into a plurality of side band frequencies; an FFT analyzer which repeatedly receives as inputs the side band frequencies from the converter and the noises from the microphone and provides as outputs side band sound pressures with respect to the side band frequencies from the converter for a predetermined gear position; a control bench where the rotative speed of the shaft is indicated and changed by an evaluator presetting an absolutely sensual evaluating value as a teacher signal with respect to the rotative speed of the shaft; and, an operation unit which repeatedly receives as inputs the side band sound pressures from the FFT analyzer to determine an average value of sound pressure values other than the side band sound pressure values and performs operations corresponding to the changed frequency of the rotative speed so that the square root of the sum of the squared value, multiplied with a coefficient, of the deviation between the side band sound pressure values from the FFT analyzer and the average value becomes the absolutely sensual evaluating value from the control bench, the coefficient being determined by simultaneous equations.

Namely, the rotative speed of the shaft provided from the tachometer is converted by the converter into plural side band frequencies which are then supplied to the FFT analyzer along with the gear noise detected by the microphone, as in the prior art.

Thus, the FFT analyzer provides as outputs sound pressure values respectively corresponding to the side band frequencies for the operation unit which determines the average value of those sound pressure values, determines the squared value of the deviation between the sound pressure value and the average value, and determines the square root of the sum of the squared values multiplied with a coefficient. The operation unit repeats operations corresponding to the changed frequency of the rotative speed of the shaft by the evaluator before the control bench until the square root becomes the absolutely sensual evaluation value provided from the control bench, and determines the above coefficient by using simultaneous equations e.g. a method of undetermined multipliers thus obtained.

When the gear noise evaluation system thus constructed is used for an actual gear noise evaluation, the operation unit has already determined the operating coefficient, so that the sound pressure value for respective side band frequencies provided from the FFT analyzer is supplied to the operation unit which will be allowed to sum the squared value, multiplied with the above coefficient, of the deviation between the average value of the sound pressure values and the sound pressure values and to determine the square root of the sum. This square root is a required sensual evaluation value.

BRIEF DESCRIPTION OF THE DRAWINGS

It is to be noted that throughout the figures, the same reference numerals indicate indentical or corresponding portions.

DESCRIPTION OF THE PREFERRED EMBODIMENT

Figure 1:
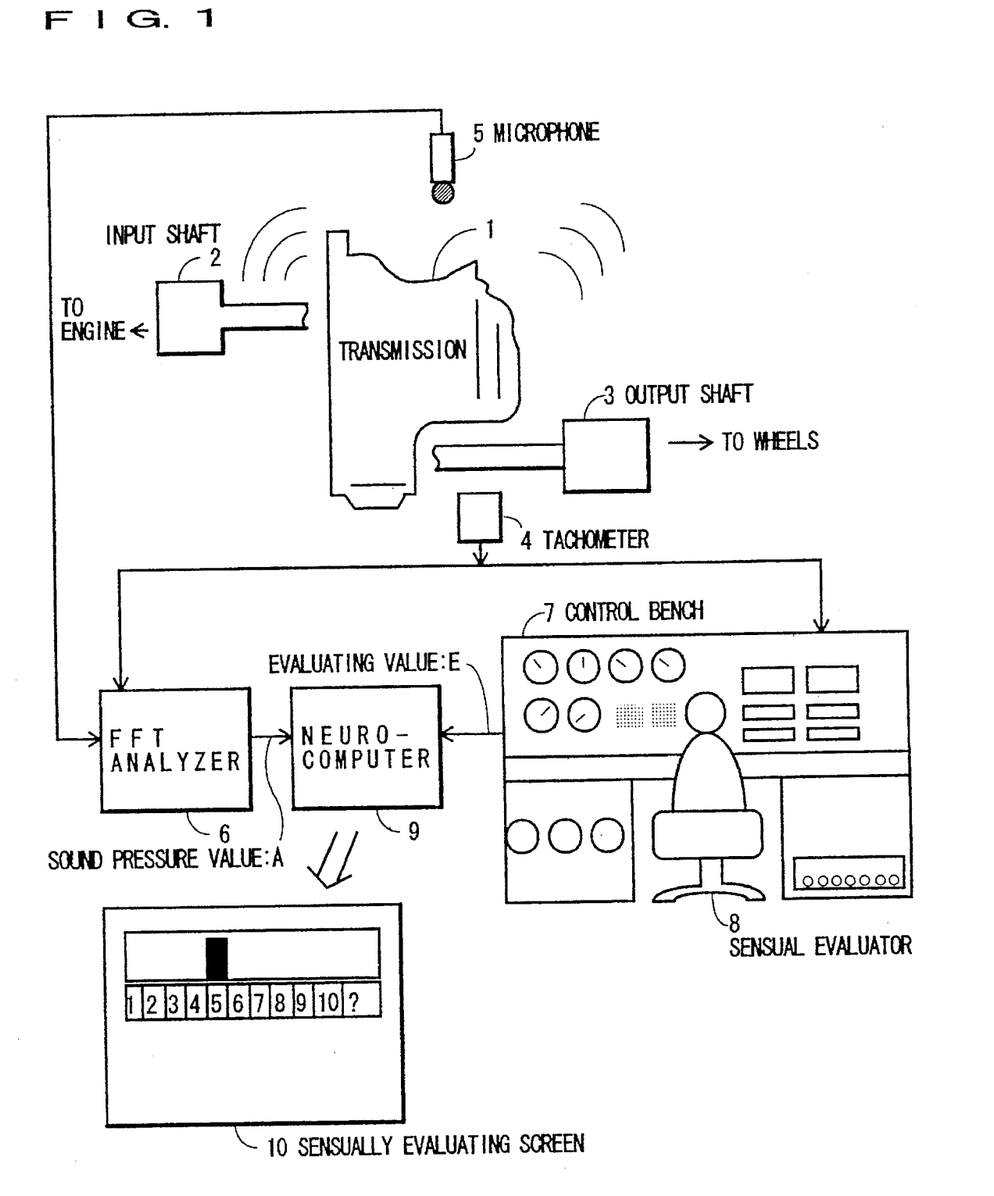
FIG. 1 is a diagram showing one enbodiment of a gear noise evaluation system according to the present invention.

[1] FIG. 1 shows a gear noise evaluation system (1) according to the present invention which is different from the prior art shown in FIG. 7 in that a neuro-computer 9 is employed which receives as an input a sound pressure value A provided from the FFT analyzer 6 and an evaluation value (teacher signal) E given by a sensual evaluator 8 sitting before the control bench 7 and which displays a sensually evaluating screen 10.

In the operation of this embodiment, the output signals from the rotative speed sensor 4 and the microphone 5 are furnished for the FFT analyzer 6 which provides an RPM tracking analysis (a sound pressure value) every rotative speed and gear engagement order for each gear position as shown referring to the prior art in FIGS. 7 and 8.

The neuro-computer 9 having received many times such a pressure value A as an input simultaneously receives from the control bench 7 an absolutely sensual evaluating value E preset by an operater who is the sensual evaluator 8 every time the rotative speed of the transmission 1 is changed one after another from the control bench 7. The absolutely sensual evaluation values are the same as indicated in Table 1.

Figure 2:
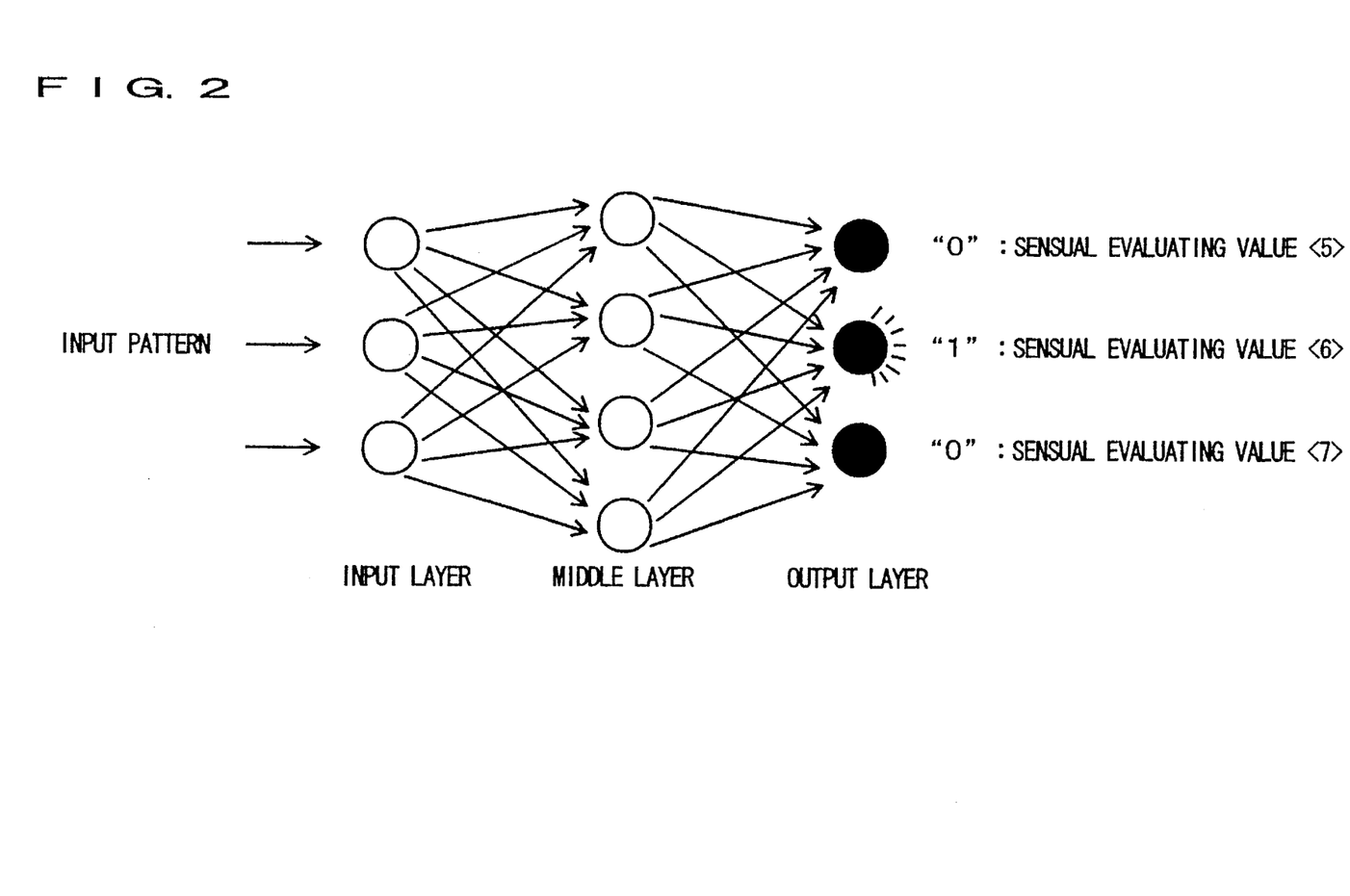
FIG. 2 is a diagram for the explanation of the priciple of a neuro-computer used in the gear noise evaluation system (1) according to the present invention.

Then, the neuro-computer 9 determines its function value through an operating process as shown in FIG. 2.

Namely, in a neural network with the backpropagation method as shown in FIG. 2, an input pattern is passed through an input layer, a middle layer, and an output layer. This neural network is formed of a kind of mapping function in which parameters as internally used are automatically modified to let the output signal in response to a certain input signal coincide with a teacher signal to be referenced. The internal parameters exist in neurons constructing the neural network, and include ① weights to be multiplied with signals provided as an input for the neuron, ② gradients of a sigmoid function which provides as an output in response to a signal multiplied with the weights, and ③ threshold values for judging whether the output has attained an effective value. Automatically adjusting these parameters will simulate the relationship between the input and the output of the teacher signal.

Specifically, in case of assigning three sensual evaluation values <5>, <6>, <7> to the output layer as shown in FIG. 2, the input pattern enables all the combination coefficients between the units to be calculated. As a result, any one of the signals obtained at the output layer is assigned "1" while the others "0".

In this example, supposing the sensual evaluation value <6> is "1", when plural sound pressure values from the FFT analyzer 6 are supplied to the neuro-computer 9, all the combination coefficients between units will be determined.

As the rotative speed is changed thereby shifting the status of "1" at the output layer one after another, the coefficients of this neural network are learned and will gradually converge into a certain value. Normally, this learning requires teacher signal data more than fifty.

This learning is repeatedly performed and then stopped when the error between the sensual evaluation value and the evaluation value given at the output layer lies in a permissive range in order to fix such a function value or coefficient.

Having thus determined the function value, the neuro-computer 9 can perform the gear noise evaluation.

Namely, when the output signal from the tachometer 4 and the gear noise from the microphone 5 are supplied to the FFT analyzer 6 and a sound pressure value A as shown in FIG. 8 is then supplied to the neuro-computer 9, which has already determined the function value, it performs an operation based on this function value to obtain the sensually evaluating screen 10. In this example, it is illustrated that the seusual evaluation value is "5".

As described above, although the FFT analyzer 6 known in the art can only have an evaluation in relation to sound pressure and frequency, the present invention using a neuro-computer equivalently performs an evaluation with "three elements of sound" including not only sound pressure and frequency which are used by an evaluator's sensual evaluation but also "tone". This always realizes an evaluation equivalent to the sensual evaluation even with an instrument.

Figure 3:
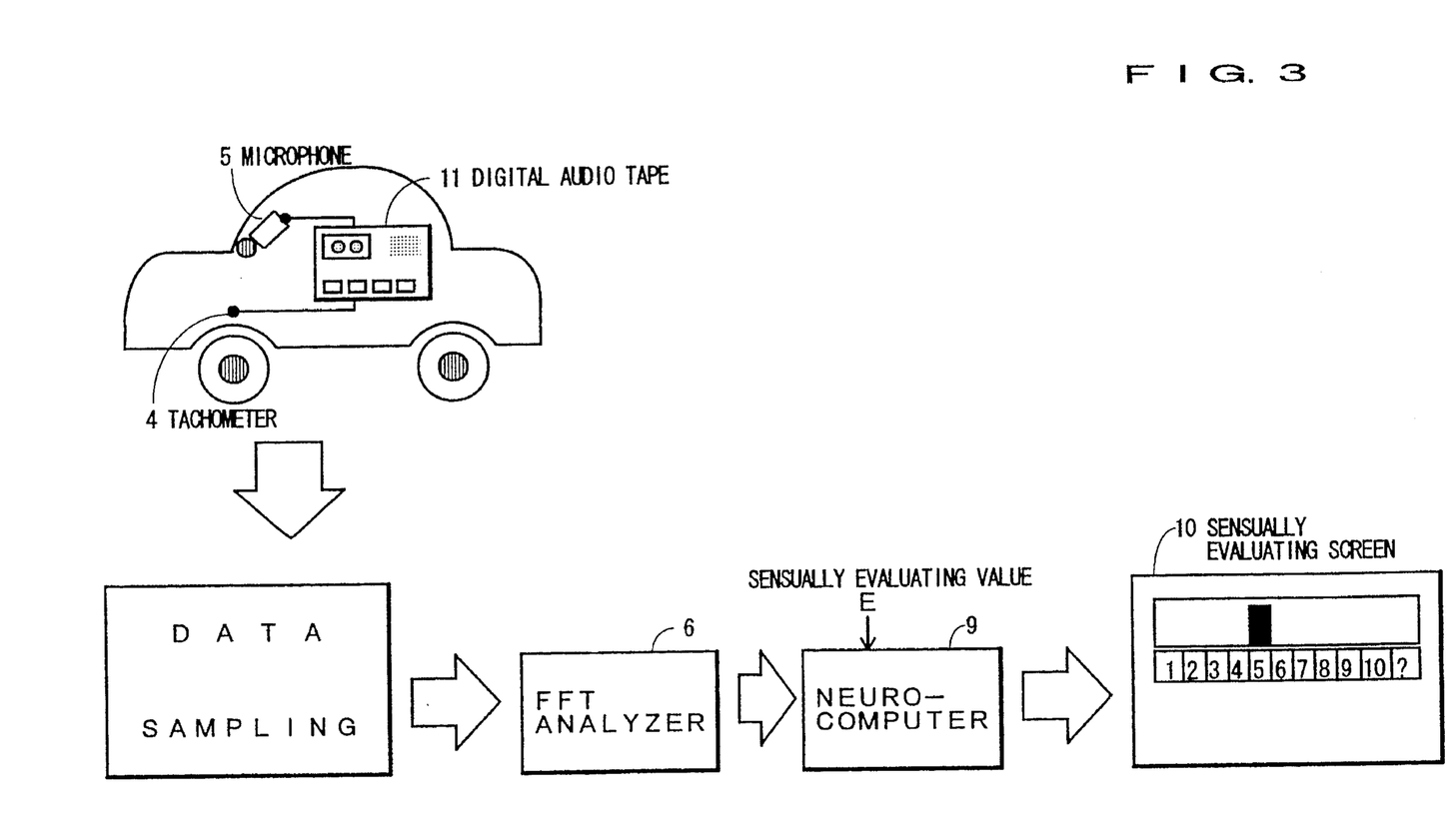
FIG. 3 is a diagram showing a gear noise evaluation system according to the present invention which is mounted on a car for an actual evaluation.

In addition to a laboratory evaluation as shown in FIG. 1, the present invention can realize an accurate gear noise evaluation even if this system is mounted on a car as shown in FIG. 3.

Namely, a rotative speed signal from the tachometer 4 and a gear noise signal from the microphone 5 are taken in a digital audio tape 11 mounted on the car. It is to be noted that while the signals are taken in the digital audio tape 11, data sampling is being performed as shown in the FIG. 3.

When the digital audio tape 11 is installed in the FFT analyzer 6, sound pressure values A from the FFT analyzer 6 are supplied to the neuro-computer 8 as in the embodiment shown in FIG. 1 whereby the sensually evaluating screen 10 is displayed.

In this case, since the system is mounted on a car to make a gear noise evaluation, various noises are mingled into the microphone 5. However, the neuro-computer 9 is similarly provided with the sensual evaluation value E by the sensual evaluator 8 as shown in FIG. 1. Therefore, the neuro-computer 9 has finally such a function value as being equivalent to an absolute evaluating value by the sensual evaluator so that the evaluation at a laboratory and a car have mutually a strong correlation.

[2] Being performed by using a neuro-computer in the above embodiments, a gear noise evaluation according to the present invention can also be made possible without such a neuro-computer.

Figure 4:
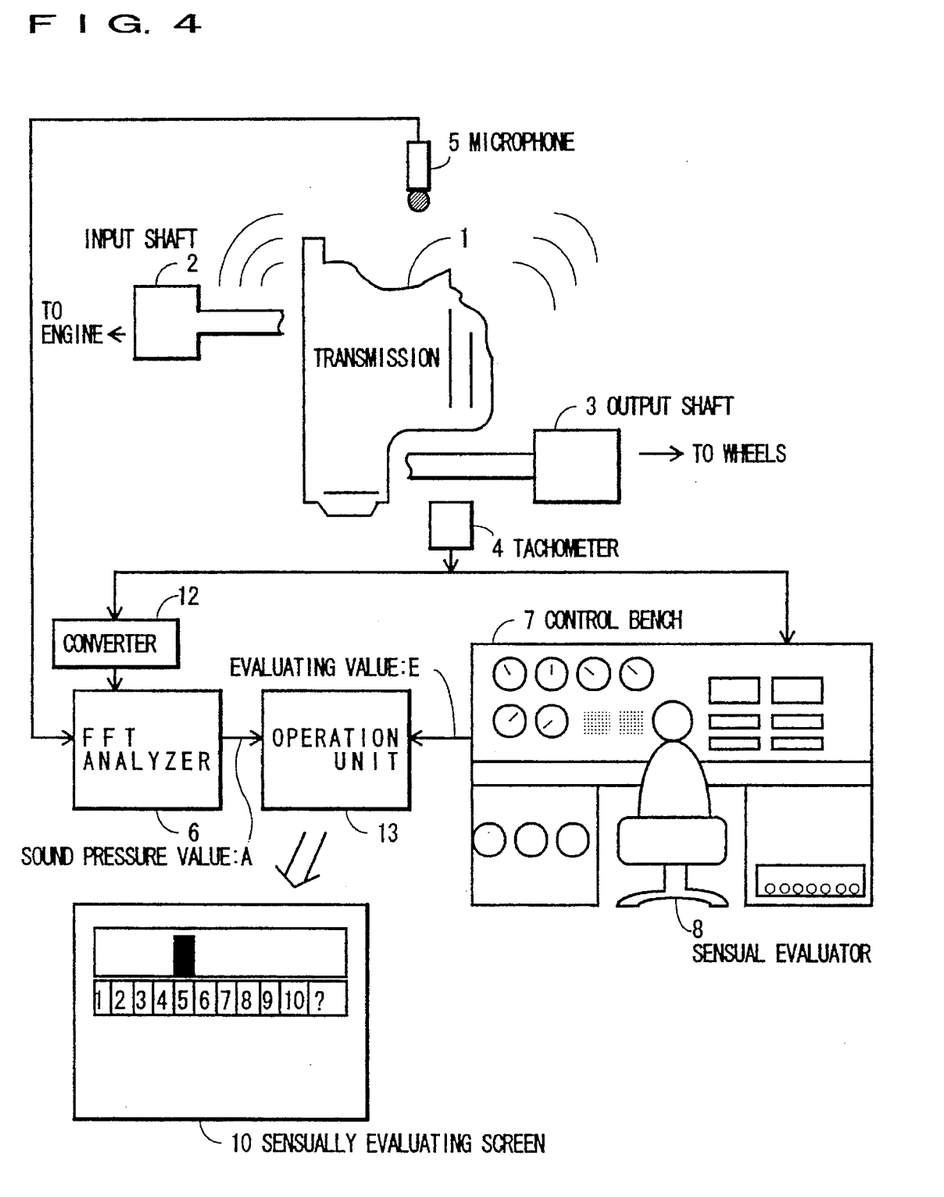
FIG. 4 is a diagram showing one embodiment of a gear noise evaluation system (2) according to the present invention.

FIG. 4 shows one embodiment in such a case as a neuro-computer is not used. Compared with the embodiment in FIG. 1, both are different in that the embodiment in FIG. 4 supplies the output signal of the tachometer 4 to the FFT analyzer 6 through a converter 12.

Namely, this converter 12 serves to make the FFT analyzer 6 to provide as an output a sound pressure value on the basis of side band frequencies of the rotative speed of the shaft 3 or 2 preset by the operator 8, the sensual evaluator.

The side band frequencies can be considered as follows: supposing that a pair of gears have a gear tooth number $Z_1$ at the driving side and a gear tooth number $Z_2$ at the driven side, the center frequency $C_{so}$ of the gear noise at the driving side is $C_{so}=(Z_1 \times N)/60$. The sound pressure at this time is assumed $A_o$.

The frequency at the time when the gear tooth number at the driving side is virtually added with one tooth, two teeth, three teeth and the like is called a side band frequency which is provided as an output from the converter 12.

For example, even if the rotative speed provided from the converter 12 is actually 2,000 rpm, it has two values in the vicinity of 2,000 rpm. The sound pressure value at the respective side band frequencies are provided as outputs from the FFT analyzer 6.

This can be expressed by the following Equation (1).

$$\left. \begin{array}{ll} C_{S1} = \dfrac{(Z_1 \pm 1) \times N}{60} & : \text{SOUND PRESSURE } A_1 \\ C_{S2} = \dfrac{(Z_1 \pm 2) \times N}{60} & : \text{SOUND PRESSURE } A_2 \\ C_{S3} = \dfrac{(Z_1 \pm 3) \times N}{60} & : \text{SOUND PRESSURE } A_3 \\ \vdots & \vdots \end{array} \right\} \quad \text{Eq. (1)}$$

It is to be noted that while the side band frequencies $C_{s1}$, $C_{s2}$, $C_{s3}$, and the like have respectively two side band frequencies, for the sake of simplification the sound pressure values are represented by one symbol as A1, A2, A3, or the like.

Being thus provided with the sound pressrue value A based on the side band frequencies, the operation unit 13 makes an operation in accordance with the following Equation (2).

$$E = \sqrt{m_1(A_1 - X)^2 + m_2(A_2 - X)^2 + m_3(A_3 - X)^2 + \ldots} \quad \text{Eq. (2)}$$

where X is the average value of the sound pressure other than $A_1$, $A_1$, $a_3$, ....

In this Eq. (2), the average value X is firstly determined for the sound pressure values other than the side band sound pressure values $A_1$, $A_2$, $A_3$, and the like. The squared value of the respective deviations between the average value X and the sound pressure values $A_1$, $A_2$, $A_3$, and the like is determined to remove a noise component (DC component) of the side band sound pressure values. The squared deviation is multiplied with respective coefficients $m_1$, $m_2$, $m_3$, and the like, which is summed to obtain the square root thereof. This result corresponds with the sensual evaluation value E which is a representative value in the case of the sensual evaluation for the gear noise being performed by an instrument.

When the operater 8 changes the rotative speed, the sound pressure value given by Eq. (1) is also changed so that collecting the sound pressure data only for the number of the coefficients $m_1$, $m_2$, $m_3$, and the like in Eq. (2) forms simultaneous equations concerning the coefficient m ($m_1$, $m_2$, $m_3$, ... ). These coefficients are obtained as values of "weighting correction coefficient" such as $m_1=1$, $m_2=0.75$, $m_3=0.75$, and so on less than 1.

In the operation unit 13 having thus obtained the weighting correction coefficients, an actual gear noise evaluation is performed. Responsive to the sound pressure value A provided as an output from the FFT analyzer 6, the opeation unit 13 carries out the calculation of Eq. (2), the value E of the square root of Eq. (2) corresponding to the absolutely sensual evaluating value.

Also in the embodiment shown in FIG. 4, the operation unit 13 can display the sensual evaluation screen 10 in the same manner as the embodiment in FIG. 1.

It is to be noted that while the above description has an example of a transmission in a car, the present invention is not limited to this example but is applicable to any portions where gear noises may occur.

As described above, in a gear noise evaluation system according to the present invention, sound pressure values from an FFT analyzer are provided for a neuro-computer. At this time, an evaluator simultaneously presets an absolutely sensual evaluating value as a teacher signal. The neuro-computer repeatedly performs a learning so that the pressure values may become the absolutely sensual evaluating value until the difference between the sound pressure value and the sensual evaluating value lies in a permissive error range thereby determining a function value.

Accordingly, the nuero-computer can determine its function value including three elements of sound in the same manner as an evaluator's sensual evaluation. Therefore, the evaluator's sensual evaluation and the instrumental sensual evaluation substantially agree with each other so that an accurate evaluation is automatically attained.

Figure 5:
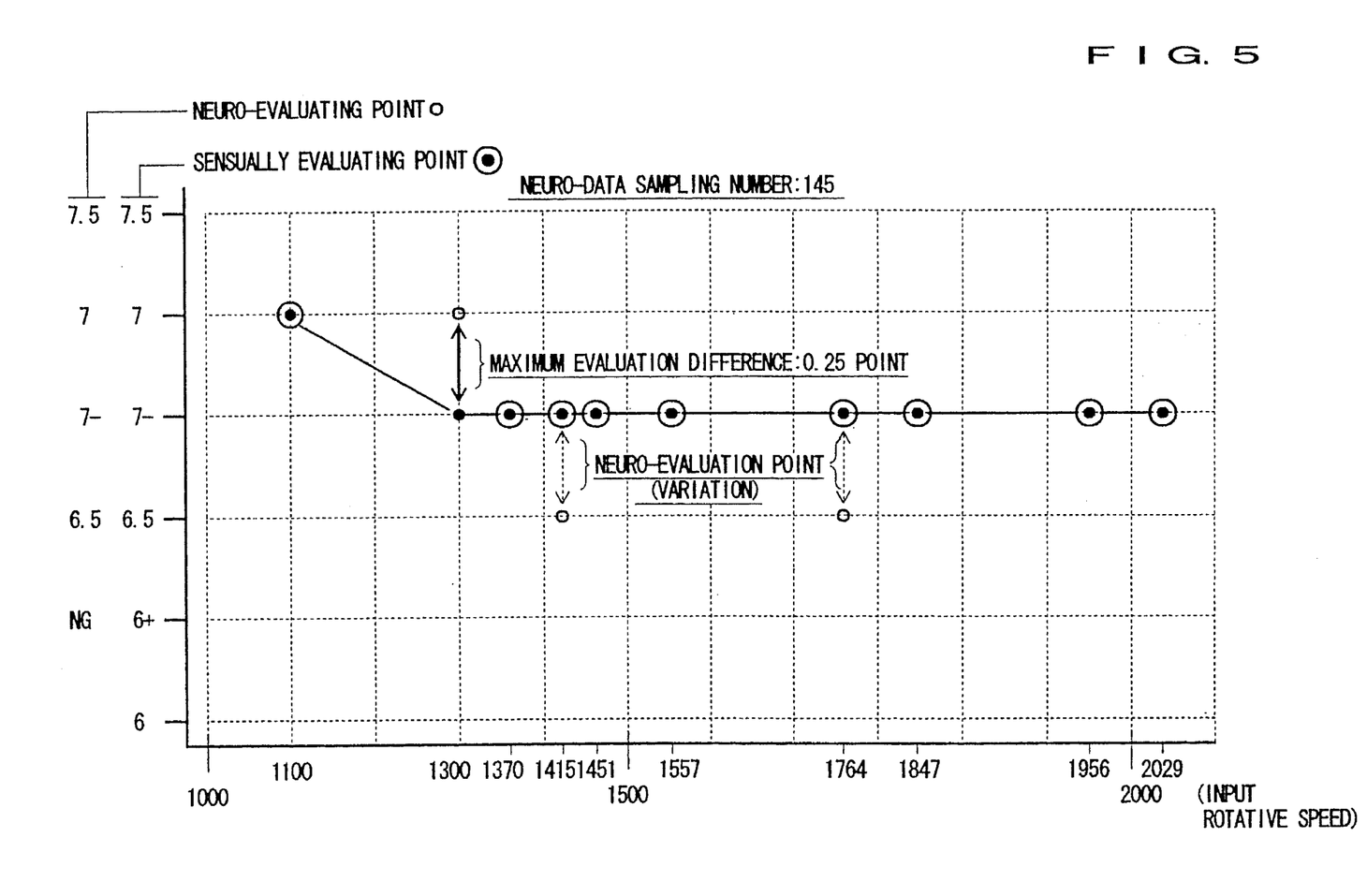
FIG. 5 is a graph illustrating a judgement (1) by a neuro-computer in the gear noise evaluation system (1) according to the present invention.

FIG. 5 shows a judgement result between an evaluation with a neuro-computer and an expert's sensual evaluation in which the sampling number for nuero data is 145. As will be seen from this judgement, the neuro-evaluation point has a permissible error range of 0.25 at maximum as compared with the sensually evaluating point.

Figure 6:
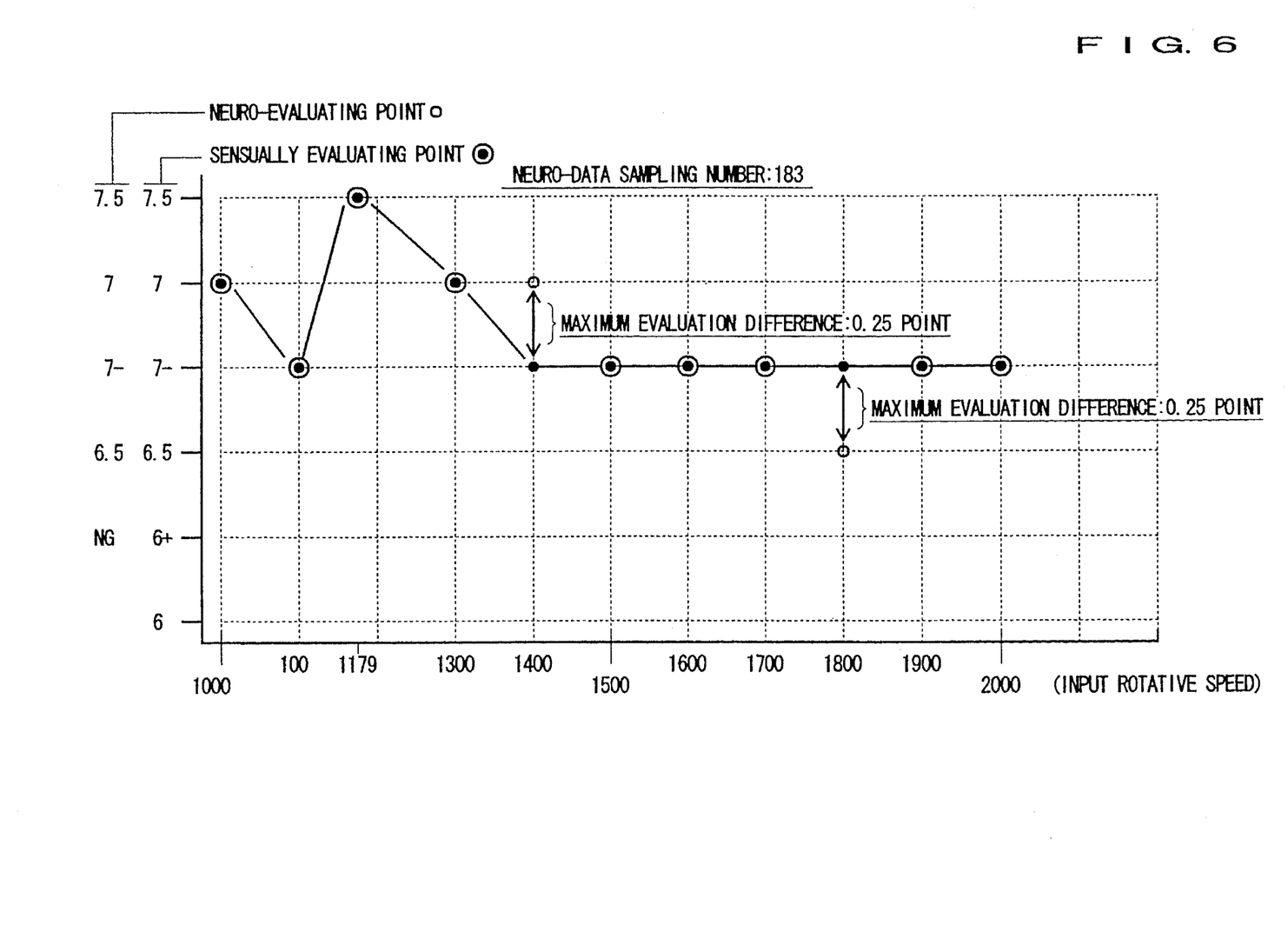
FIG. 6 is a graph illustrating a judgement (2) by a neuro-computer in the gear noise evaluation system (2) according to the present invention.

In a judgement result shown in FIG. 6, although the sampling number for the neuro data is increased to 183, the maximum evaluation difference is confined within 0.25 point.

Also, since the present invention carries out a gear noise evaluation with reference to the sensual evaluation value not only in the case where it is done at a laboratory but also in the case where it is mounted on a car, both have a very strong correlation.

Furthermore, without any neuro-computer, a predetermined operation is made by using a concept of plural side band frequencies with respect to rotative speeds whereby a correcting coefficient can be obtained corresponding to evaluator's sensual evaluation value, with the same effect as in the above.

Having described the present invention by way of the preferred embodiment, it can be seen how the objects of the invention have been attained. As this invention may be embodied in several forms without departing from the spirit of the invention, the present embodiment is therefore illustrative and not restrictive since the scope of the invention is defined by the appended claims and includes such eqivalent forms as will be apparent to those skilled in the art.

What we claim is:

1. A gear noise evaluation system comprising;

a tachometer for detecting a rotative speed of a shaft on which a gear is mounted;

a microphone for detecting a noise from said gear;

an FFT analyzer which repeatedly receives as an input the rotative speed from said tachometer and the noise from said microphone and provides as an output a sound pressure value with respect to the rotative speed for a predetermined gear position;

a control bench where the rotative speed of the shaft is indicated and changed by an evaluator presetting an absolutely sensual evaluating value as a teacher signal with respect to the rotative speed of the shaft; and, a neuro-computer which receives as an input the sound pressure value from said FFT analyzer, learns to attain the absolutely sensual evaluating value, stops learning when the difference between the sound pressure value and the absolutely sensual evaluating value from said control bench lies in a permissive error range thereby determining a function value.

2. A gear noise evaluation system as claimed in claim 1, wherein said neuro-computer comprises a sensually evaluating screen for displaying the absolutely sensual evaluating value obtained by a predetermined operation based on the function value.

3. A gear noise evaluation system as claimed in claim 1, further comprising a digital audio tape for taking in the rotative speed from said tachometer and the noise from said microphone and means for sampling data of said digital audio tape and for providing the sampling data for said FFT analyzer.

4. A gear noise evaluation system comprising;

a tachometer for detecting a rotative speed of a shaft on which a gear is mounted;

a microphone for detecting a noise from said gear;

a converter for converting the frequency of the rotative speed from said tachometer into a plurality of side band frequencies;

an FFT analyzer which repeatedly receives as inputs the side band frequencies from said converter and the noises from said microphone and provides as outputs side band sound pressure values with respect to the side band frequencies from said converter for a predetermined gear position;

a control bench where the rotative speed of the shaft is indicated and changed by an evaluator presetting an absolutely sensual evaluating value as a teacher signal with respect to the rotative speed of the shaft; and, an operation unit which repeatedly receives as inputs the side band sound pressures from said FFT analyzer to determine the average value of sound pressure values other than the side band sound pressure values and performs operations corresponding to the changed frequency of the rotative speed so that the square root of the sum of the squared value, multiplied with a coefficient, of the deviation between the side band sound pressure values from said FFT analyzer and the average value becomes the absolutely sensual evaluating value from said control bench, the coefficient being determined by simultaneous equations.

5. A gear noise evaluation system as claimed in claim 4, wherein said operation unit comprises a sensually evaluating screen for displaying the absolutely sensual evaluating value obtained by a predetermined operation based on the coefficient.

\* \* \* \* \*

UNITED STATES PATENT AND TRADEMARK OFFICE
CERTIFICATE OF CORRECTION

PATENT NO. : 5,574,646
DATED : November 12, 1996
INVENTOR(S) : Kawasaki et al

It is certified that error appears in the above-indentified patent and that said Letters Patent is hereby corrected as shown below:

Title Page, Abstract
 Line 6, after "learning" insert --process--.

Column 1
 Line 11, delete "an".

Column 7
 Line 36, change "$a_3$" to --$A_3$--.

Signed and Sealed this

First Day of April, 1997

BRUCE LEHMAN

Attest:

Attesting Officer

Commissioner of Patents and Trademarks